(12) United States Patent
Sharp

(10) Patent No.: US 7,128,344 B2
(45) Date of Patent: Oct. 31, 2006

(54) DOLLY FOR PORTABLE AIR COMPRESSOR

(75) Inventor: Tom Sharp, Jackson, TN (US)

(73) Assignee: Midwest Air Technologies, Inc., Lincolnshire, IL (US)

( * ) Notice: Subject to any disclaimer, the term of this patent is extended or adjusted under 35 U.S.C. 154(b) by 17 days.

(21) Appl. No.: 10/680,547

(22) Filed: Oct. 7, 2003

(65) Prior Publication Data

US 2005/0073118 A1      Apr. 7, 2005

(51) Int. Cl.
  *B60P 3/22*     (2006.01)
  *B62B 1/00*     (2006.01)
  *F04B 53/00*    (2006.01)
  *A01G 25/09*    (2006.01)

(52) U.S. Cl. .................. 280/830; 280/47.24; 417/235; 137/899.4

(58) Field of Classification Search ................ 280/830, 280/836, 47.24, 47.26, 47.34, 79.2; 417/234, 417/235, 363; 137/899, 899.1, 899.4
See application file for complete search history.

(56) References Cited

U.S. PATENT DOCUMENTS

| | | | | |
|---|---|---|---|---|
| 1,756,806 A * | 4/1930 | Beach | ..................... | 137/899.4 |
| 2,122,656 A * | 7/1938 | Paget | ..................... | 137/899.4 |
| 2,490,305 A * | 12/1949 | Jones | ..................... | 280/830 |
| 2,789,756 A * | 4/1957 | Allen | ..................... | 137/899.4 |
| 2,804,259 A * | 8/1957 | Ralston | ..................... | 137/899.4 |
| 2,826,354 A * | 3/1958 | Field | ..................... | 137/899.4 |
| 3,335,766 A * | 8/1967 | Winger | ..................... | 141/38 |
| 4,135,669 A * | 1/1979 | Bridges et al. | ............. | 239/373 |
| 4,264,282 A * | 4/1981 | Crago | ..................... | 417/234 |
| 4,698,983 A * | 10/1987 | Hechavarria | ................. | 62/292 |
| 4,722,673 A * | 2/1988 | Grime et al. | ............... | 417/360 |
| 4,759,560 A * | 7/1988 | Virgulti | ..................... | 280/47.26 |
| 4,902,226 A * | 2/1990 | Elliott et al. | ................ | 433/104 |
| 5,038,578 A * | 8/1991 | Manz et al. | .................. | 62/292 |
| 5,306,121 A * | 4/1994 | Heflin et al. | ................ | 417/363 |
| 5,386,925 A * | 2/1995 | Lane | ..................... | 220/530 |
| 5,503,295 A * | 4/1996 | Kotarba et al. | ............. | 220/581 |
| 5,964,579 A * | 10/1999 | Tang et al. | .................. | 417/363 |
| 6,336,794 B1 * | 1/2002 | Kim | ..................... | 417/363 |
| 6,532,990 B1 * | 3/2003 | Wood et al. | ............. | 137/899.4 |
| 6,551,066 B1 * | 4/2003 | Saylor et al. | ............. | 417/44.2 |
| 6,773,237 B1 * | 8/2004 | Burford et al. | ............. | 417/234 |
| 6,863,198 B1 * | 3/2005 | Darby | ..................... | 224/403 |
| 6,912,865 B1 * | 7/2005 | Seo et al. | ..................... | 62/295 |
| 6,935,642 B1 * | 8/2005 | Craig et al. | ............. | 280/47.24 |
| 2004/0096341 A1 * | 5/2004 | Hung | ..................... | 417/363 |
| 2005/0089412 A1 * | 4/2005 | Kwang-Tsan | ............... | 417/363 |

FOREIGN PATENT DOCUMENTS

JP    02003243475 A  *  8/2003  ................. 417/363

* cited by examiner

*Primary Examiner*—Christopher P. Ellis
*Assistant Examiner*—John Walters
(74) *Attorney, Agent, or Firm*—Greer, Burns & Crain, Ltd.

(57) ABSTRACT

A dolly and compressor assembly for transporting compressors has a frame with a handle structure and a support portion. At least one wheel and a platform are attached to and supported by the support portion. To accommodate a compressor, a retention formation is disposed on the platform for engaging the compressor. The compressor, in turn, is provided with a receptor structure configured to receive the retention formation on the platform.

13 Claims, 2 Drawing Sheets

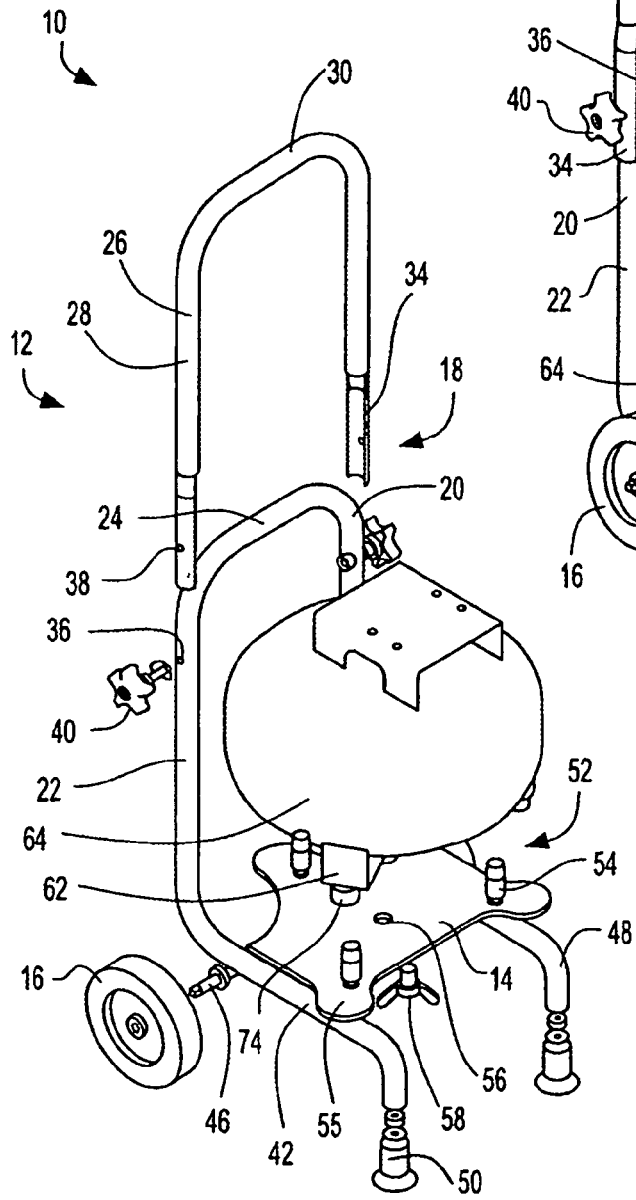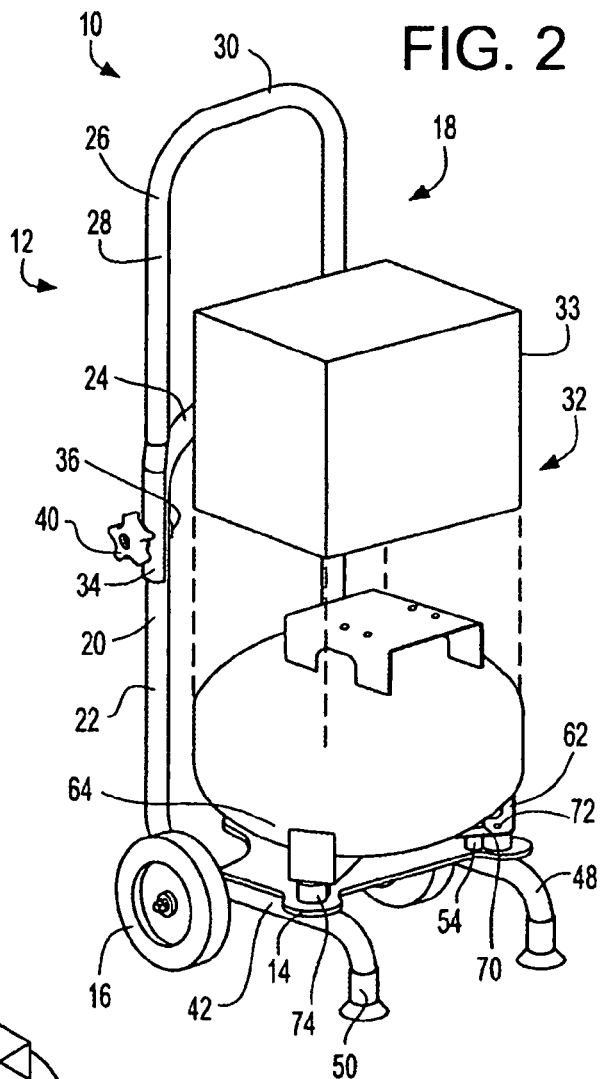

DOLLY FOR PORTABLE AIR COMPRESSOR

BACKGROUND OF THE INVENTION

The present invention relates generally to dollies and hand carts, and more particularly, to a dolly configured for the support and movement of a compressor, gas tank, or other similar heavy machinery to and from a jobsite.

Air compressors required for use with large pneumatically-powered tools on jobsites, such as power fastener drivers including roofing nailers, can generally weigh as much as 70 pounds and are very difficult to move over long distances or rough terrain, such as commonly found at construction sites. Moving the compressor or gas tank is physically demanding to the workers.

Another problem with moving compressors and gas tanks is that they can be damaged, such as when they are dropped or when they are carried by parts not designed to bear the weight of the article. Further, particular care must be taken to prevent damage when transporting tanks containing compressed air, fuel, volatile gases or other contents.

To address this problem, a dolly can be used to transport compressors or gas tanks with a measure of maneuverability over difficult terrain. However, conventional dollies have been configured for the transport of generic articles and devices, mainly articles with flat surfaces, and cannot accommodate large, rounded compressors or gas tanks.

Where some prior art dollies have been configured for transporting unconventional objects, the loads have typically been secured to the handle that extends from the dolly platform, such as by wrapping a cargo strap or belt around the object and the handle. A problem with securing the article to the handle is that the bottom of the article is not secured to the platform. There is still relative motion between the article and the platform and articles can slip off the dolly platform. Another disadvantage of the cargo strap is that it must be wrapped around a sturdy, load-bearing portion of the article while also being located where the strap will not slip off the article. Because compressors and gas tanks are generally rounded and/or smooth, cargo straps often slip from the surface of the article such that the article is not positively secured.

Alternatively, platforms of prior art dollies have been provided with a raised rim for confining an article within the perimeter of the platform. One drawback of the raised rim is that it cannot be adapted for use with a wide range of large articles because the article shapes are constrained by the perimeter of the platform. A further disadvantage of the raised rim configuration is that, as long as the article's center of gravity is above the raised rim, the article can tip out of the dolly when in an inclined position. A situation where this might occur is when the dolly is used over a surface with various discontinuities and/or irregularities. The dolly platform may become inclined and the article may tip out over the raised rim.

Another prior art attempt to address this problem is to permanently mount, i.e. by welding, the compressor on a cart or dolly. A disadvantage of this approach is that the compressor cannot be removed from the cart for work in remote locations or when space is limited.

Another disadvantage with conventional dollies is that padding or buffer material is not provided to lessen the relative motion or vibration between the platform and the article. Vibration, particularly from compressor operation, can cause potential damage to the dolly and/or the underlying substrate.

Accordingly, there is a need for a dolly that can detachably hold a heavy article such as an air compressor.

There is also a need for a dolly that includes a retention formation to prevent the compressor or other item from slipping or tipping off the dolly platform.

A further need is for a dolly that can buffer vibration or other motion on the compressor.

SUMMARY OF THE INVENTION

The above-listed needs are met or exceeded by the present dolly which detachably holds an air compressor or other item. The present dolly features at least one retention formation for keeping the compressor or gas tank from moving relative to a dolly platform. Furthermore, the present dolly is provided with a buffer to damper or alleviate compressor vibration or motion. In addition, the dolly is configured for accommodating a wide range of compressor shapes, sizes and weights.

More specifically, a dolly and compressor assembly includes a dolly having a platform for supporting a compressor. A retention formation is disposed on the platform and engages a receptor structure on the compressor. The dolly also has a frame including a handle structure and a support portion for supporting the platform. Further, at least one wheel is attached to the frame for moving the dolly.

A dolly for use with a compressor is also provided. Specifically, the dolly is used with a compressor having a bottom portion and a receptor structure disposed on the bottom portion. The dolly includes a frame having a handle structure and a support portion, and at least one wheel attached to the frame. The support portion of the dolly supports a platform. A retention formation including at least one lug is associated with the platform, and is configured for detachably engaging the receptor structure of the compressor.

Further, a compressor for use with a dolly having a frame, at least one wheel attached to the frame, a platform supported by the frame, and a retention formation associated with the platform is provided. The compressor has a bottom portion and a receptor structure disposed on the bottom portion. The receptor structure of the compressor is configured for engaging the retention formation of the dolly.

BRIEF DESCRIPTION OF THE DRAWINGS

FIG. 1 is an exploded front perspective view of the dolly and compressor of the present invention;

FIG. 2 is a front perspective view of the dolly and compressor of FIG. 1.

DETAILED DESCRIPTION

Figure 3:
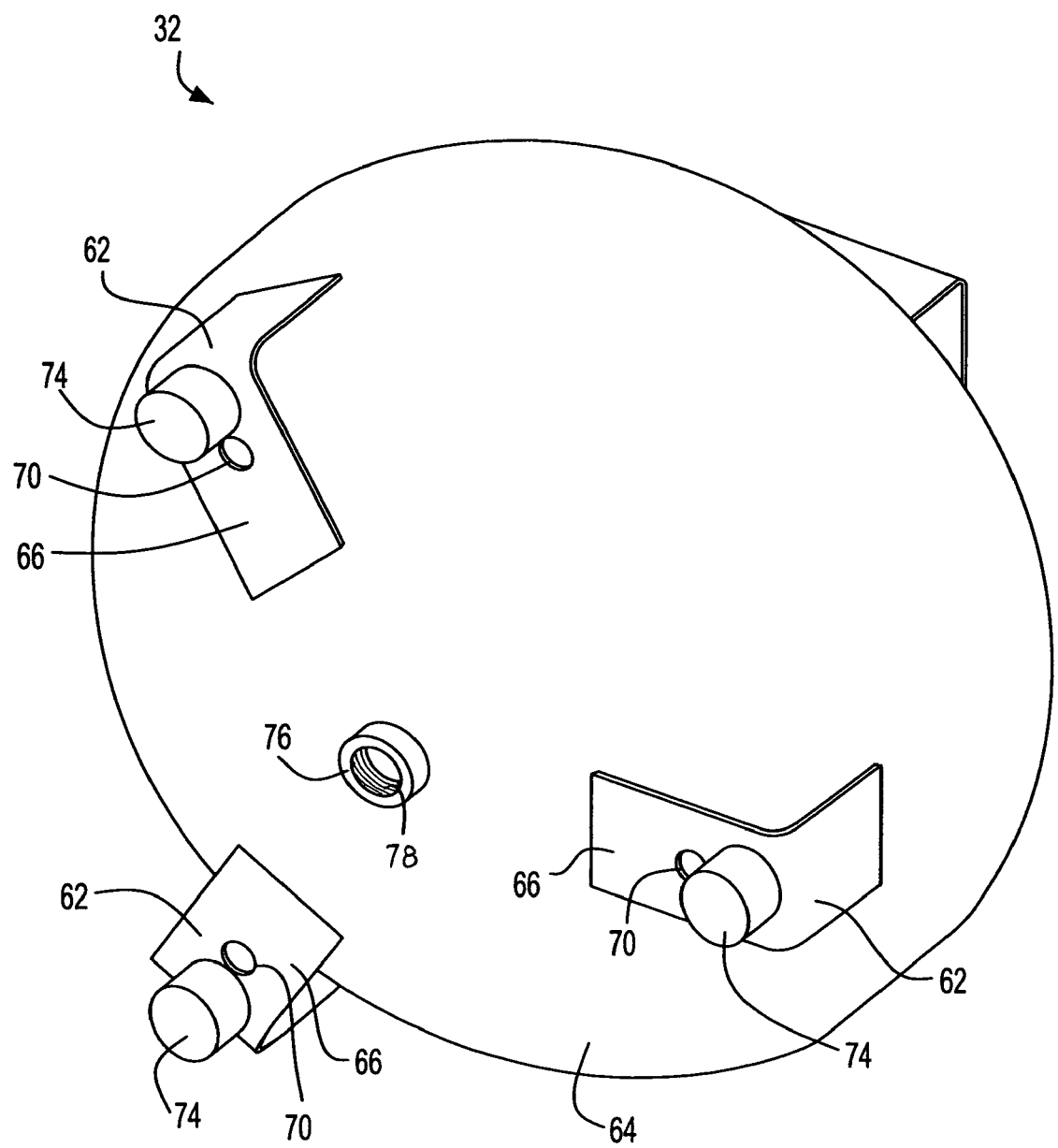
FIG. 3 is a bottom perspective view of the compressor of FIG. 1.

Now referring to FIGS. 1–3, a dolly incorporating the features of the present invention is generally designated 10 and includes a frame generally designated 12, a platform 14, and at least one, but preferably two wheels 16. Preferably integrally formed, or alternatively formed as separate members, the frame 12 includes a handle structure 18 having a first inverted "U"-shaped frame portion 20 with first arms 22 and a first crossbar 24. A second inverted "U"-shaped frame portion 26 of the handle 18 is outwardly located relative to, and extends from the first inverted "U"-shaped portion 20. On the second frame portion 26, second arms 28 and a second cross bar 30 are also preferably integrally formed to define the "U"-shape. Further, the first arms 22 are spaced a distance apart to allow a compressor, gas tank, fuel tank or any other large article 32, to occupy the space between the arms. This spacing distance may vary to suit the application. The first and second crossbars 24, 30 may also be provided with a grip enhancing coating or material for facilitating grasping and directing the handle structure 18 of the dolly 10.

In the preferred embodiment, the first portion 20 and the second portion 26 are each constructed of a single piece of strong, rigid and durable material such as tubular steel which has been bent into a "U"-shape. The second portion 26 has open, half-sleeve free ends 34 adjacent the first portion 20. The ends 34 are configured for slidingly engaging the outside of the first portion 20 and are configured for adjusting the handle height.

To lock the adjusted handle height, each of the first portion 20 and the second portion 26 have at least one corresponding aperture 36, 38, respectively, that when aligned, are locked in position with a threaded fastener, locking pin or bolt 40. It is contemplated that a series of holes may be provided along the portions 20, 26. Alternatively, brackets may be used, or any other way of providing relative vertical adjustability. In an alternate embodiment, the frame 12 is integrally formed, instead of being constructed of multiple pieces as shown. Each portion 20, 26 may also be provided in multiple components.

Lower ends 42 of the arms 22 of the frame 12 are bent to form support portions which are generally perpendicular to the arms. The ends 42 are configured to form a generally horizontal support. A platform 14 provides a level surface upon which the compressor 32 can be received and is attached to the frame 12, preferably by a weld, at the bent support ends 42. While other configurations are contemplated, the platform 14 is preferably formed of a single, unitary metal plate of a thickness which can provide the desired strength to support the compressor 32. It is contemplated that the compressor 32 includes a storage tank provided with a motor/assembly 33 (shown schematically in FIG. 2) which is electrically or fuel operated, as shown in the art.

The wheels 16 are operably attached adjacent to and are in alignment with one of the bent support ends 42. The wheels 16 may be treaded, solid, pneumatic or configured as wide rollers, and further, may be of any size or type that can support the weight of the compressor 32. Additionally, the wheels 16 are preferably spaced a distance apart along an axle 46 for accommodating the width and shape of the compressor 32 placed on the platform 14.

A frame knee tip 48 is located adjacent to and is generally perpendicular to each of the bent support ends 42 for contacting a substrate. Preferably, the knees 48 are integrally formed with the bent support ends 42 in the first frame portion 20. To facilitate gripping, the knees 48 preferably have rubber feet 50 disposed on the bottom of the knees at the point of contact with a substrate. Although the feet 50 preferably have at least a rubber exterior, other materials are contemplated.

Attached to the bent support ends 42, the platform 14 is provided with a retention formation 52. In the preferred embodiment, the retention formation 52 includes at least one and preferably a plurality of upwardly extending locating projections or lugs 54. The lugs 54 are disposed at least one, but preferably three locations spaced a distance apart on an upper surface 55 of the platform 14. Permanently attached, such as by welding, or threadably engaged generally perpendicular to the platform 14, the lugs 54 are generally cylindrical, having a length greater than a width, but other shapes, orientations or dimensions are contemplated. Also on the platform 14, a hole 56 is preferably generally centrally located and is configured to receive a fastener 58 such as a threaded wing nut.

In terms of design choice, the platform 14 may be of any shape that will sufficiently support the weight of the article 32 and, in turn, be adequately supported by the frame bent support ends 42, while accommodating the shape of the article. In the preferred embodiment, the platform 14 has an irregular shape that is the result of eliminating unnecessary material, thereby reducing material costs. Reinforcing ribs, or other structural members configured for providing strength and rigidity to a load-bearing plate may also be added to the dolly 10. The platform 14 may also extend beyond the width of the bent support portion 42 or beyond the arms 22 to accommodate larger compressors or articles 32. Additionally, the lugs 54 are preferably spaced a distance apart on the platform 14 to provide greater stability of the compressor 32.

Referring now to FIGS. 2 and 3, the compressor 32 is provided with a receptor structure 62, preferably bracket legs, at a bottom portion 64. Other receptors include cradles, frames, bores in the compressor exterior, or any other structure configured to receive the retention formation 52. In the preferred embodiment, each bracket leg 62 is preferably made of metal and is welded to the compressor exterior such that the compressor 32 stands generally level on a substrate. The bracket leg 62 has two holes in a bottom surface 66, a first hole 70 for receiving the lug 54, and a second hole 72 for attaching an isolator 74 with a fastener (not shown). The first hole 70 is dimensioned to be slightly larger than the lugs 44 of the retention formation 52 so that the formation can be slidingly and matingly engaged within the hole.

In the preferred embodiment, the isolator 74 may be glued or otherwise fixedly attached to the bottom surface 66 of the leg 62. It should be noted that the legs 62 are not limited to bent or linear legs, but any configuration of leg in which the isolator 74 can be attached is contemplated. Additionally, it is preferable that each leg 62 is provided with the isolator 74 so that at each point of contact with the substrate, the compressor 32 is provided with shock absorption/vibration dampening through the isolators.

The isolator 74 is preferably a piece of hard rubber having a Durometer hardness of approximately 80 Shores. Further, the isolator 74 is preferably uniformly cylindrical and disposed adjacent the first hole 70 so that the isolator is adjacent the lug 54, as shown in FIG. 3. For complete insertion of the lug 54 into the first hole 70, the isolator 74 has a height less than the length of the lug 54. Although the isolator 74 of FIGS. 1–3 is shown cylindrical, any shape and size of isolator is contemplated that allows insertion of the lug 54 into the first hole 70 while being disposed between the isolator and the platform 14 for shock absorption/vibration dampening purposes.

In an alternate embodiment, the isolator 74 is configured for receiving the lugs 54 in locating tunnels (not shown). Spanning the entire height of the isolator 74, the tunnels may have a length less than the height of the lugs 54. Additionally, the first hole 70 is located on each leg 62 and may be in alignment with the locating tunnels.

When the lug 54 is introduced to the isolator 74, it protrudes from the locating tunnel, is received in the hole 70, and protrudes from the hole on the opposite side. Upon bearing the full weight of the compressor 32, the isolator 74 is compressible such that a larger portion of the lug 54 protrudes through the hole 70. In this way, the legs 62 of the article 32 bear the shear stress from the lugs 62 while being retained on the platform 14.

To further secure the compressor 32 to the platform 14, the compressor is provided with a boss 76 with a receiving hole 78, preferably threaded, that is configured to receive the threaded fastener 58. The boss 76 is preferably welded to the compressor, but other known ways of fixedly attaching the boss are contemplated. After placing the compressor 32 on the retention formation 52, the boss 76 is immediately adjacent to and aligned with the hole 70. The threaded fastener 58 is inserted through the hole 56 from the side of the platform 14 opposite the compressor 32, and is received in the boss 76. When the fastener 58 is tightened in the boss 76, the compressor 32 is positively secured to, and vibrationally isolated from the platform 14. To remove the compressor 32 from the platform 14, the fastener 58 is loosened from the boss 76 and the compressor is lifted such that the isolators 74 and the legs 62 clear the lugs 62.

While particular embodiments of the present dolly for a compressor have been shown and described, it will be appreciated by those in the art that changes and modifications may be made thereto without departing from the invention in its broader aspects and as set forth in the following claims.

I claim:

1. A dolly and compressor assembly comprising:
   a frame having at least one handle structure and a support portion;
   at least one wheel attached to said frame;
   a platform supported by said support portion and having a retention formation disposed on a generally planar, level platform surface; and
   a compressor having an air tank and a receptor structure disposed on a bottom portion of said air tank, said receptor structure configured for engaging said retention formation;
   wherein said platform has a hole, and said air tank has a boss with a receiving hole, wherein said boss and receiving hole are configured to receive a threaded fastener inserted through said hole of said platform.

2. The dolly and compressor assembly of claim 1 wherein said retention formation further comprises at least one lug.

3. The dolly and compressor assembly of claim 2 wherein said at least one lug extends from said generally planar, level platform surface and is configured for detachably engaging said receptor structure.

4. The dolly and compressor assembly of claim 1 wherein said receptor structure further comprises at least one leg.

5. The dolly and compressor assembly of claim 4 wherein said at least one leg further includes a hole being sized to mechanically accommodate said retention formation, which is aligned with said hole.

6. The dolly and compressor assembly of claim 1 further including at least one isolator.

7. The dolly and compressor assembly of claim 6 wherein said at least one isolator is disposed between said receptor structure and said platform.

8. A dolly for use with a compressor including an air tank, said air tank having a bottom portion and a receptor structure disposed on said bottom portion, comprising:
   a frame having a handle structure and a support portion;
   at least one wheel attached to said frame; and
   a platform supported by said support portion and having a retention formation disposed on a generally planar, level platform surface, said retention formation having a plurality of lugs in a spaced arrangement and configured for detachably engaging the receptor structure disposed at the bottom portion of the air tank;
   wherein said retention formation includes a hole disposed in said platform and located generally at the center of said arrangement of lugs.

9. The dolly of claim 8 wherein said support portion and said handle structure are generally perpendicular to each other.

10. The dolly of claim 8 wherein said lugs are disposed on said generally planar, level platform surface for matingly engaging a plurality of holes disposed on the receptor structure.

11. A compressor for use with a dolly having a frame, at least one wheel attached to said frame, a platform supported by said frame, and a retention formation associated with said platform comprising:
    an air tank having a bottom portion;
    at least one leg attached to said air tank and extending beneath said bottom portion of said air tank; and
    a receptor structure disposed on said at least one leg and configured for engaging the retention formation;
    wherein said receptor structure further comprises a boss with a receiving hole disposed on said bottom portion of said air tank, said receiving hole being threaded.

12. The compressor of claim 11 wherein said at least one leg further comprises a hole sized to mechanically accommodate the retention formation, which is aligned with said hole.

13. The compressor of claim 11 wherein said receptor structure further comprises at least one isolator located on a bottom surface of said at least one leg.

* * * * *